(12) United States Patent
Chen et al.

(10) Patent No.: US 12,103,863 B2
(45) Date of Patent: Oct. 1, 2024

(54) PARTICULATE FILTERING DEVICE WITH A MULTI-LAYER WATER DISTRIBUTION AND COLLECTION STRUCTURE AND METHOD FOR USING THE SAME

(71) Applicant: Zhejiang Hengdong Environmental Technology Co., Ltd., Zhejiang (CN)

(72) Inventors: Lei Chen, Zhejiang (CN); Zheng Zhong, Zhejiang (CN); Pengfei Gu, Zhenjiang (CN)

(73) Assignee: Zhejiang Hengdong Environmental Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/916,259

(22) Filed: Jun. 30, 2020

(65) Prior Publication Data
US 2021/0002145 A1 Jan. 7, 2021

(30) Foreign Application Priority Data
Jul. 3, 2019 (CN) .......................... 201910592371.6

(51) Int. Cl.
*C02F 1/00* (2006.01)
*B01D 24/14* (2006.01)
(Continued)

(52) U.S. Cl.
CPC .............. *C02F 1/001* (2013.01); *B01D 24/14* (2013.01); *B01D 24/18* (2013.01);
(Continued)

(58) Field of Classification Search
CPC .. C02F 1/001; C02F 1/283; C02F 1/78; C02F 9/00; C02F 2305/023; C02F 2303/16;
(Continued)

(56) References Cited

U.S. PATENT DOCUMENTS 2,154,434 A * 4/1939 Bond, Jr. ............... C10G 25/00
  208/290
3,011,643 A * 12/1961 Mccoy ............... B01D 24/4631
  210/167.13
5,256,307 A * 10/1993 Bachhofer ............ C02F 1/5245
  210/709

FOREIGN PATENT DOCUMENTS

CN   200978540 Y   11/2007
CN   200978541 Y   11/2007
(Continued)

OTHER PUBLICATIONS

International Search Report in PCT/CN2020/099616, dated Sep. 1, 2020 (14 pages).

*Primary Examiner* — Matthew O Savage
(74) *Attorney, Agent, or Firm* — Faegre Drinker Biddle Reath LLP

(57) ABSTRACT

A particulate filtering device with a multi-layer water distribution and collection structure and a method for using the same are provided. The device includes a tank where a filtering space and a back flushing expansion space are formed. An upper water distribution pipe is arranged above the back flushing expansion space and is in communication with an ozone gas-water mixing pipe. Ozone enters the back flushing expansion space through the upper water distribution pipe and mix with water for reaction. Exhaust gas is discharged from the top of the tank. Powdered activated carbon may enter the tank through the upper water distribution pipe, and is intercepted at a space above the filtering space to form an activated carbon layer, to absorb organics dissolved in the water and catalytically decompose ozone. At least three water distribution and collection pipes are arranged on a layer basis in the filtering space.

10 Claims, 15 Drawing Sheets

(51) Int. Cl.
 *B01D 24/18* (2006.01)
 *B01D 24/46* (2006.01)
 *C02F 1/28* (2006.01)
 *C02F 1/78* (2006.01)
 *C02F 9/00* (2006.01)

(52) U.S. Cl.
 CPC .......... *B01D 24/4631* (2013.01); *C02F 1/283* (2013.01); *C02F 1/78* (2013.01); *C02F 9/00* (2013.01)

(58) Field of Classification Search
 CPC .................. C02F 2103/42; C02F 1/281; C02F 2201/002; C02F 2303/04; B01D 24/14; B01D 24/18; B01D 24/4631
 See application file for complete search history.

(56) References Cited

FOREIGN PATENT DOCUMENTS

| | | |
|---|---|---|
| CN | 200981823 Y | 11/2007 |
| CN | 201030250 Y | 3/2008 |
| CN | 201263910 Y | 7/2009 |
| JP | 2005000847 A | 1/2005 |
| RU | 2663746 C1 | 8/2018 |

* cited by examiner

PARTICULATE FILTERING DEVICE WITH A MULTI-LAYER WATER DISTRIBUTION AND COLLECTION STRUCTURE AND METHOD FOR USING THE SAME

The present application claims priorities to Chinese Patent Application No. 201910592371.6, titled "PARTICULATE FILTERING DEVICE WITH A MULTI-LAYER WATER DISTRIBUTION AND COLLECTION STRUCTURE AND METHOD FOR USING THE SAME", filed on Jul. 3, 2019 with the Chinese Patent Office, which is incorporated herein by reference in its entirety.

FIELD

The present disclosure relates to the field of filtering technology, in particular to a particulate filtering device with a multi-layer water distribution and collection structure and a method for using the same.

BACKGROUND

In a conventional particulate filter, to-be-filtered water flows into the particulate filter through a water inlet at the top of the particulate filter for being filtered by a filtering layer. Filtered water is collected by a water collection filtering pipe or a filtering cap and then flows out through a water collecting pipe at the bottom of the particulate filter. A conventional silica sand filter is convenient to operate and easy to maintain, however, the silica sand filter requires a large occupation area and a high investment cost.

In a water treatment process for a swimming pool or a water park, ozone is required to perform oxidation disinfection. An ozone reaction tank and an activated carbon adsorption tank are required for a whole half-stream ozone disinfection process, resulting in a large occupation area and a high investment cost.

Taking a swimming pool with an international standard size of 50 m×25 m×2 m as an example, if the whole half-stream ozone disinfection process is adopted, according to the lowest national design standard for a circulation of 4 hours, eight silica sand filtering tanks with a diameter of two meters, three ozone reaction tanks with a diameter of two meters, and six activated carbon adsorption tanks with a diameter of two meters, that is, seventeen tanks, are required, which results in an incredible occupation area and investment cost.

SUMMARY

A particulate filtering device with a multi-layer water distribution and collection structure and a method for using the same are provided according to the present disclosure to solve the problem of low filtering efficiency and large occupation area in the conventional technology.

The particulate filtering device with a multi-layer water distribution and collection structure according to the present disclosure includes a tank, particle filtering material, multiple water distribution and collection pipes, an upper water distribution pipe, a water inlet manifold, a filtered water outlet manifold, an ozone gas-water mixing pipe, a back flushing and flushing drain-pipe and a water pump. A filtering space is formed in a lower portion of the tank and a back flushing expansion space is formed in an upper portion of the tank. The particle filtering material is filled in the filtering space. The multiple water distribution and collection pipes are arranged on a layer basis in the filtering space, where each of water distribution and collection pipes is arranged horizontally, and each of the water distribution and collection pipes is provided with filtering sticks. The upper water distribution pipe is arranged in the back flushing expansion space, where the multiple water distribution and collection pipes and the upper water distribution pipe each extends out the tank at one end in a sealing manner. The water inlet manifold is connected in parallel with an extending end of each of one or more of the water distribution and collection pipes via a pipe. The filtered water outlet manifold is connected in parallel with an extending end of each of the rest of the water distribution and collection pipes, where valves are respectively arranged between the water distribution and collection pipe and the water inlet manifold and between the water distribution and collection pipe and the filtered water outlet manifold, an extending end of the upper water distribution pipe is connected with the water inlet manifold and the filtered water outlet manifold via a tee pipe, a valve is arranged between the upper water distribution pipe and the water inlet manifold. The ozone gas-water mixing pipe is connected between the upper water distribution pipe and the water inlet manifold, where a valve is arranged between the upper water distribution pipe and the filtered water outlet manifold. The back flushing and flushing drain-pipe is connected between the upper water distribution pipe and the filtered water outlet manifold. The water pump is connected with the water inlet manifold. An air outlet is arranged on a top of the tank, and an automatic air valve is arranged at the air outlet.

In an embodiment, a diameter of the particle filtering material ranges from 0.15 mm to 0.8 mm, and a ratio of a distance between adjacent layers of water distribution and collection pipes to an average diameter of the particle filtering material is equal to or greater than 800.

In an embodiment, the filtering sticks arranged in a fishbone-like distribution are connected with another end of each of the water distribution and collection pipe other than the extending end, each of the filtering stick is provided with a water inlet and outlet slot, and a width of the water inlet and outlet slot is less than the diameter of the particle filtering material.

In an embodiment, another end of the upper water distribution pipe other than the extending end is connected with a water distribution port with an upward opening.

In an embodiment, the number of the multiple water distribution and collection pipes is three, and the three water distribution and collection pipes include a second water distribution and collection pipe, a third water distribution and collection pipe and a fourth water distribution and collection pipe from top to bottom. The second water distribution and collection pipe is in communication with the filtered water outlet manifold, and a fourth valve and a seventh valve are arranged between the second water distribution and collection pipe and the filtered water outlet manifold. The third water distribution and collection pipe is in communication with the water inlet manifold, and a second valve is arranged between the third water distribution and collection pipe and the water inlet manifold. The fourth water distribution and collection pipe is in communication with the water inlet manifold, and a third valve is arranged between the fourth water distribution and collection pipe and the water inlet manifold; and the fourth water distribution and collection pipe is in communication with the filtered water outlet manifold, and a fourth valve is arranged between the fourth water distribution and collection pipe and the filtered water outlet manifold. The upper water distribution pipe is in communication with the water inlet manifold, and a first valve is arranged between the upper water distribution pipe and the water inlet manifold. The water inlet manifold is in communication with the filtered water outlet manifold, and a sixth valve, a fifth valve and the fourth valve are arranged between the water inlet manifold and the filtered water outlet manifold. The ozone gas-water mixing pipe is connected between the first valve and the upper water distribution pipe. The back flushing and flushing drain-pipe is connected between the sixth valve and the fifth valve.

A method for performing filtering by the particulate filtering device with a multi-layer water distribution and collection structure is further provided according to the present disclosure, which includes:

opening the first valve, the second valve, the fourth valve and the seventh valve, closing the third valve, the fifth valve and the sixth valve, and turning on the water pump, to guide to-be-filtered water to flow into the tank through the water inlet manifold, where a part of the to-be-filtered water flows into the filtering space through the filtering sticks of the third water distribution and collection pipes, filtered water formed by filtering the part of the to-be-filtered water through the particle filtering material flows into the filtered water outlet manifold through the fourth water distribution and collection pipe and is discharged out, and another part of the to-be-filtered water flows into the back flushing expansion space through the upper water distribution pipe, and then flows into the filtering space after flowing through the back flushing expansion space, filtered water formed by filtering the another part of the to-be-filtered water through the particle filtering material flows into the filtered water outlet manifold through the second water distribution and collection pipe and is discharged out.

A method for performing back flushing by the particulate filtering device with a multi-layer water distribution and collection structure is further provided according to the present disclosure, which includes:

opening the third valve and the sixth valve, closing the first valve, the second valve, the fourth valve, the fifth valve and the seventh valve, and turning on the water pump, to guide back flushing water to flow into the tank through the water inlet manifold, where the back flushing water flows into the filtering space through the filtering sticks of the fourth water distribution and collection pipe, to make a filtering layer formed by the particle filtering material expand, to flush impurities attaching to the particle filtering material into the back flushing expansion space, and the back flushing water and the impurities flow into the upper water distribution pipe through the water distribution port, and are discharged out through the back flushing and flushing drain-pipe.

A method for performing activated carbon adsorption by the particulate filtering device with a multi-layer water distribution and collection structure is further provided according to the present disclosure, which includes:

opening the first valve, the fifth valve and the seventh valve, closing the second valve, the third valve, the fourth valve and the sixth valve, connecting the water inlet manifold to an activated carbon powder slurry delivery pipe, and turning on the water pump, to draw activated carbon powder slurry through the water inlet manifold, where the activated carbon powder slurry is delivered to a space above the filtering space through the upper water distribution pipe to form an activated carbon layer; and in a filtering phase, opening the first valve, the fourth valve and the seventh valve, closing the second valve, the third valve, the fifth valve and the sixth valve, connecting the water inlet manifold to a to-be-filtered water delivery pipe, to guide to-be-filtered water to flow into the tank through the water inlet manifold, where the to-be-filtered water is delivered to the back flushing expansion space through the upper water distribution pipe, the to-be-filtered water is processed by organics adsorption through the activated carbon layer and is filtered by the particle filtering material to form filtered water, the filtered water flows into the filtered water outlet manifold through the second water distribution and collection pipe and is discharged out.

A method for performing filtering/ozone reaction by the particulate filtering device with a multi-layer water distribution and collection structure is further provided according to the present disclosure, which includes:

opening the first valve, the fourth valve and the seventh valve, and closing the second valve, the third valve, the fifth valve and the sixth valve, and connecting the water inlet manifold to a to-be-filtered water delivery pipe, to guide ozone water to flow into the tank through an ozone gas-water mixing pipe and guide to-be-filtered water flow into the tank through the water inlet manifold, where the to-be-filtered water is delivered into the back flushing expansion space through the upper water distribution pipe for reacting with ozone, gas in ozone gas water mixture and undisclosed ozone are escaped from water, and are discharged into an exhaust gas solver through the automatic air valve on the top of the tank, ozone dissolved into water disinfect the water while oxidizing and decomposing substances in the water, filtered water flows into the filtered water outlet manifold through the second water distribution and collection pipe and the fourth water distribution and collection pipe and is discharged out.

A method for performing filtering/ozone reaction/activated carbon adsorption/hydroxyl generation by the particulate filtering device with a multi-layer water distribution and collection structure is further provided according to the present disclosure, which includes:

opening the first valve, the fifth valve and the seventh valve, closing the second valve the third valve, the fourth valve and the sixth valve, connecting the water inlet manifold to an activated carbon powder slurry delivery pipe, and turning on the water pump, to draw activated carbon powder slurry through the water inlet manifold, where the activated carbon powder slurry is delivered to a space above the filtering space through the upper water distribution pipe to form an activated carbon layer;

opening the first valve, the fourth valve and the seventh valve, closing the second valve, the third valve, the fifth valve and the sixth valve, and connecting the water inlet manifold to a to-be-filtered water delivery pipe, to guide ozone water to flow into the tank through an ozone gas-water mixing pipe and guide to-be-filtered water flow into the tank through the water inlet manifold, where the to-be-filtered water is delivered into the back flushing expansion space through the upper water distribution pipe for reacting with ozone, gas in ozone gas water mixture and undisclosed ozone are escaped from water, and are discharged into an exhaust gas solver through the automatic air valve on the top of the tank, ozone is decomposed catalysis of activated carbon to generate a strong oxidant hydroxyl when the ozone water flows through the activated carbon layer, to perform oxidation and disinfection on the to-be-filtered water, then filtered water flows into the filtered water outlet manifold through the second water distribution and collection pipe and the fourth water distribution and collection pipe and is discharged out.

The beneficial effects of the present disclosure are described as follows:

1. multiple layers of water distribution and collection pipes are arranged in a filtering tank, such that a space in the filtering tank can be full used, which can increase a filtering area by more than three times, and reduce the occupation area and the usage amount of filtering material to be three times less than that of a conventional filter, thereby saving the investment cost;

2. a frequency and the number of times for performing back flushing can be improved. A back flushing period for a filter of a conventional swimming pool is five days, thus a lot of suspended particles are intercepted by the filtering material. Since the suspended particles may contain a lot of organics from bodies of humans after they use a swimming pool and a water park, if the organics react with disinfector in water such as chlorine and the like, chlorine may be consumed, and disinfecting by-products may also generated. However, with the tank according to the present disclosure, a usage amount of filtering material is reduced, such that the frequency for performing back flushing can be increased, which reduces dwell duration of the suspended particles intercepted in the tank, thereby reducing an amount of the suspended particles reacting with chlorine, thus reducing a usage amount of chlorine and reducing the generated by-product;

3. a back flushing expansion space in formed at the top of the tank, which can leave a space for expanded filtering materials when performing back flushing. Moreover, the back flushing expansion space can also be used for performing ozone reacting and gas discharging, where ozone enters the tank through a water distribution pipe at the top of the tank, and exhaust gas is discharged from the top of the tank;

4. when performing filtering/ozone reacting, a space for ozone reacting is increased, that is, in addition to the back flushing expansion space, a part of the filtering space can also be used, in which pores are formed by about 30% of particle filtering materials in the filtering space. after being dissolved in water, ozone can be used to decompose impurities in the water and perform oxidative decomposition on impurities adhered to the particle filtering material, reducing a usage amount of chlorine; and 5. the tank can be used as an activated carbon adsorption reacting tank. In the operating process, activated carbon is drew into the tank through a water inlet manifold, in this case, other water inlet pipes are in a closed state and are opened after the activated carbon is added. The activated carbon are intercepted to remain above the filtering space to absorb organics. When ozone is added, the ozone reacts with the activated carbon to generate a strong oxidant hydroxyl for oxidation and disinfection, thereby consuming ozone dissolved in water.

With the particulate filtering device with a multi-layer water distribution and collection structure according to the present disclosure, a filtering space is fully used in a multifunction manner, thereby saving the occupation area and reducing a usage amount of filtering material.

Figure 1:
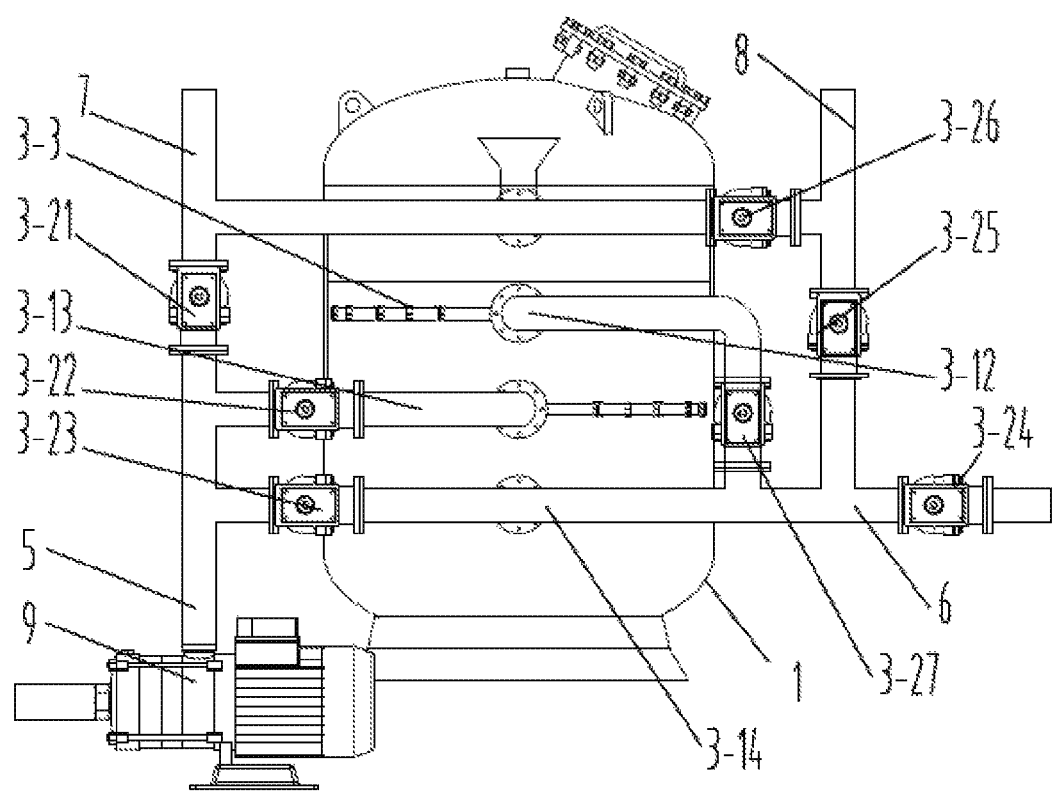
FIG. 1 is a schematic structural diagram of a particulate filtering device with a multi-layer water distribution and collection structure according to the present disclosure.
Figure 2:
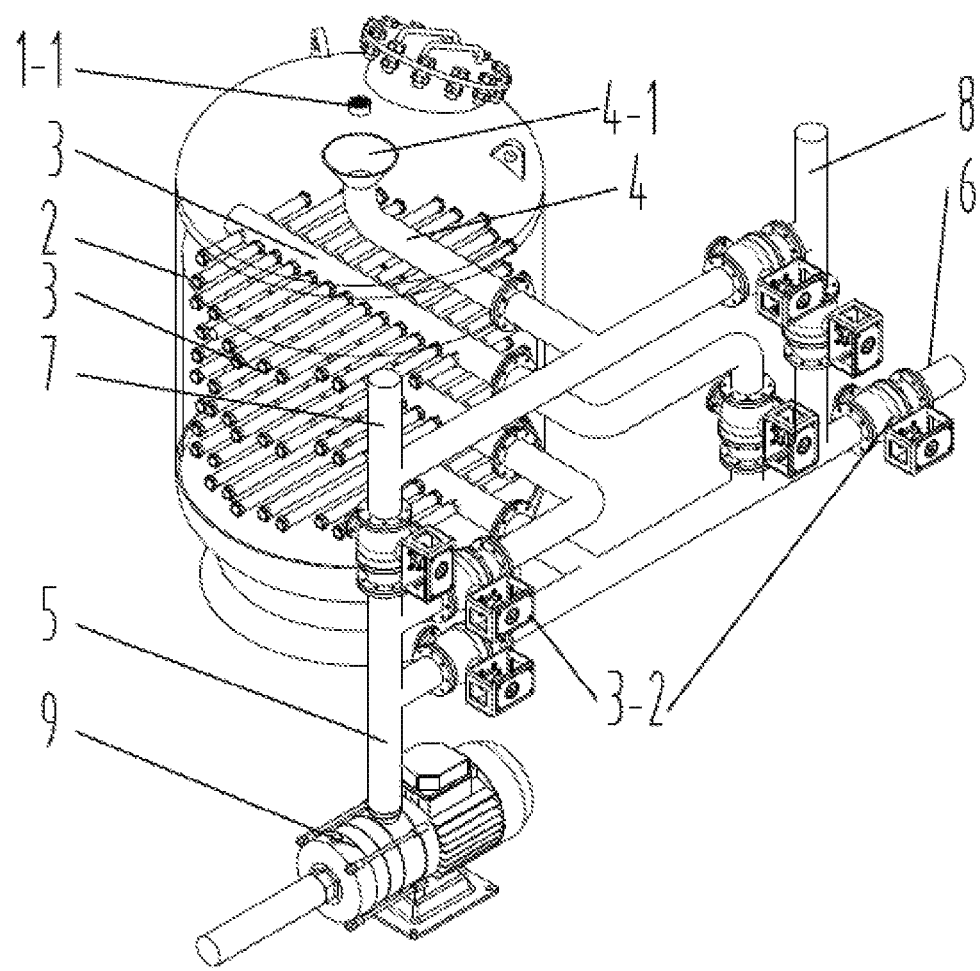
FIG. 2 is a schematic structural diagram of the particulate filtering device with a multi-layer water distribution and collection structure according to the present disclosure when viewing from another aspect.

| 1 | tank | 1-1 | air outlet |
|---|---|---|---|
| 2 | particle filtering material | 3 | water distribution and collection pipe |
| 3-12 | second water distribution and collection pipe | 3-13 | third water distribution and collection pipe |
| 3-14 | fourth water distribution and collection pipe | 3-15 | fifth water distribution and collection pipe |
| 3-16 | sixth water distribution and collection pipe | 3-2 | valve |
| 3-21 | first valve | 3-22 | second valve |
| 3-23 | third valve | 3-24 | fourth valve |
| 3-25 | fifth valve | 3-26 | sixth valve |
| 3-27 | seventh valve | 3-3 | filtering stick |
| 4 | upper water distribution pipe | 4-1 | water distribution port |
| 5 | water inlet manifold | 6 | filtered water outlet manifold |
| 7 | ozone gas-water mixing pipe | 8 | back flushing and flushing drain-pipe |
| 9 | water pump | 10 | activated carbon layer |

DETAILED DESCRIPTION

A particulate filtering device with a multi-layer water distribution and collection structure and a method for using the same according to the present disclosure are described in detail below.

The particulate filtering device with a multi-layer water distribution and collection structure includes a tank 1, particle filtering material 2, multiple water distribution and collection pipes 3, an upper water distribution pipe 4, a water inlet manifold 5, a filtered water outlet manifold 6, an ozone gas-water mixing pipe 7, a back flushing and flushing drain-pipe 8, and a water pump 9. A filtering space is formed in a lower portion of the tank and a back flushing expansion space is formed in an upper portion of the tank. The particle filtering material 2 is filled in the filtering space. The multiple water distribution and collection pipes 3 are arranged on a layer basis in the filtering space, where each of water distribution and collection pipes 3 is arranged horizontally, and each of the water distribution and collection pipes 3 is provided with filtering sticks 3-3. The upper water distribution pipe 4 is arranged in the back flushing expansion space, where the multiple water distribution and collection pipes 3 and the upper water distribution pipe 4 each extends out the tank 1 at one end in a sealing manner. The water inlet manifold 5 is connected in parallel with an extending end of each of one or more of the water distribution and collection pipes 3 via a pipe. The filtered water outlet manifold 6 is connected in parallel with an extending end of each of the rest of the water distribution and collection pipes 3, where valves 3-2 are respectively arranged between the water distribution and collection pipe 3 and the water inlet manifold 5 and between the water distribution and collection pipe 3 and the filtered water outlet manifold 6, an extending end of the upper water distribution pipe 4 is connected with the water inlet manifold 5 and the filtered water outlet manifold 6 via a tee pipe, a valve 3-2 is arranged between the upper water distribution pipe 4 and the water inlet manifold 5. The ozone gas-water mixing pipe 7 is connected between the upper water distribution pipe 4 and the water inlet manifold 5, where a valve 3-2 is arranged between the upper water distribution pipe 4 and the filtered water outlet manifold 6. The back flushing and flushing drain-pipe 8 is connected between the upper water distribution pipe 4 and the filtered water outlet manifold 6. The water pump 9 is connected with the water inlet manifold 5. An air outlet 1-1 is arranged on a top of the tank 1, and an automatic air valve is arranged at the air outlet.

In an embodiment, a diameter of the particle filtering material 2 ranges from 0.15 mm to 0.8 mm, and a ratio of a distance between adjacent layers of water distribution and collection pipes 3 to an average diameter of the particle filtering material 2 is equal to or greater than 800.

In an embodiment, the filtering sticks 3-3 arranged in a fishbone-like distribution are connected with another end of each of the water distribution and collection pipe 3 other than the extending end, each of the filtering stick 3-3 is provided with a water inlet and outlet slot, and a width of the water inlet and outlet slot is less than the diameter of the particle filtering material 2.

In an embodiment, another end of the upper water distribution pipe 4 other than the extending end is connected with a water distribution port 4-1 with an upward opening.

First Embodiment

A particulate filtering device with a multi-layer water distribution and collection structure is provided. As shown in FIGS. 1, 2, 4 and 5, the number of the multiple water distribution and collection pipes 3 is three, and the three water distribution and collection pipes 3 include a second water distribution and collection pipe 3-12, a third water distribution and collection pipe 3-13 and a fourth water distribution and collection pipe 3-14 from top to bottom. The second water distribution and collection pipe 3-12 is in communication with the filtered water outlet manifold 6, and a fourth valve 3-24 and a seventh valve 3-27 are arranged between the second water distribution and collection pipe 3-12 and the filtered water outlet manifold 6. The third water distribution and collection pipe 3-13 is in communication with the water inlet manifold 5, and a second valve 3-22 is arranged between the third water distribution and collection pipe 3-13 and the water inlet manifold 5. The fourth water distribution and collection pipe 3-14 is in communication with the water inlet manifold 5, and a third valve 3-23 is arranged between the fourth water distribution and collection pipe 3-14 and the water inlet manifold 5. The fourth water distribution and collection pipe 3-14 is in communication with the filtered water outlet manifold 6, and a fourth valve 3-24 is arranged between the fourth water distribution and collection pipe 3-14 and the filtered water outlet manifold 6. The upper water distribution pipe 4 is in communication with the water inlet manifold 5, and a first valve 3-21 is arranged between the upper water distribution pipe 4 and the water inlet manifold 5. The water inlet manifold 5 is in communication with the filtered water outlet manifold 6, and a sixth valve 3-26, a fifth valve 3-25 and the fourth valve 3-24 are arranged between the water inlet manifold 5 and the filtered water outlet manifold 6. The ozone gas-water mixing pipe 7 is connected between the first valve 3-21 and the upper water distribution pipe 4. The back flushing and flushing drain-pipe 8 is connected between the sixth valve 3-26 and the fifth valve 3-25.

A method for performing filtering by the particulate filtering device with a multi-layer water distribution and collection structure is further provided. The method includes: opening the first valve 3-21, the second valve 3-22, the fourth valve 3-24 and the seventh valve 3-27, closing the third valve 3-23, the fifth valve 3-25 and the sixth valve 3-26, and turning on the water pump 9, to guide to-be-filtered water to flow into the tank 1 through the water inlet manifold 5. A part of the to-be-filtered water flows into the filtering space through the filtering sticks 3-3 of the third water distribution and collection pipes 3-13, filtered water formed by filtering the part of the to-be-filtered water through the particle filtering material 2 flows into the filtered water outlet manifold 6 through the fourth water distribution and collection pipe 3-14 and is discharged out. Another part of the to-be-filtered water flows into the back flushing expansion space through the upper water distribution pipe 4, and then flows into the filtering space after flowing through the back flushing expansion space, filtered water formed by filtering the another part of the to-be-filtered water through the particle filtering material 2 flows into the filtered water outlet manifold 6 through the second water distribution and collection pipe 3-12 and is discharged out.

Second Embodiment

A particulate filtering device with a multi-layer water distribution and collection structure is provided. As shown in FIGS. 1, 2, 6 and 7, the number of the multiple water distribution and collection pipes 3 is three, and the three water distribution and collection pipes 3 include a second water distribution and collection pipe 3-12, a third water distribution and collection pipe 3-13 and a fourth water distribution and collection pipe 3-14 from top to bottom. The second water distribution and collection pipe 3-12 is in communication with the filtered water outlet manifold 6, and a fourth valve 3-24 and a seventh valve 3-27 are arranged between the second water distribution and collection pipe 3-12 and the filtered water outlet manifold 6. The third water distribution and collection pipe 3-13 is in communication with the water inlet manifold 5, and a second valve 3-22 is arranged between the third water distribution and collection pipe 3-13 and the water inlet manifold 5. The fourth water distribution and collection pipe 3-14 is in communication with the water inlet manifold 5, and a third valve 3-23 is arranged between the fourth water distribution and collection pipe 3-14 and the water inlet manifold 5. The fourth water distribution and collection pipe 3-14 is in communication with the filtered water outlet manifold 6, and a fourth valve 3-24 is arranged between the fourth water distribution and collection pipe 3-14 and the filtered water outlet manifold 6. The upper water distribution pipe 4 is in communication with the water inlet manifold 5, and a first valve 3-21 is arranged between the upper water distribution pipe 4 and the water inlet manifold 5. The water inlet manifold 5 is in communication with the filtered water outlet manifold 6, and a sixth valve 3-26, a fifth valve 3-25 and the fourth valve 3-24 are arranged between the water inlet manifold 5 and the filtered water outlet manifold 6. The ozone gas-water mixing pipe 7 is connected between the first valve 3-21 and the upper water distribution pipe 4. The back flushing and flushing drain-pipe 8 is connected between the sixth valve 3-26 and the fifth valve 3-25.

A method for performing back flushing by the particulate filtering device with a multi-layer water distribution and collection structure is further provided. The method includes: opening the third valve 3-23 and the sixth valve 3-26, closing the first valve 3-21, the second valve 3-22, the fourth valve 3-24, the fifth valve 3-25 and the seventh valve 3-27, and turning on the water pump 9, to guide back flushing water to flow into the tank 1 through the water inlet manifold 5. The back flushing water flows into the filtering space through the filtering sticks 3-3 of the fourth water distribution and collection pipe 3-14, to make a filtering layer formed by the particle filtering material 2 expand, to flush impurities attaching to the particle filtering material 2 into the back flushing expansion space, and the back flushing water and the impurities flow into the upper water distribution pipe 4 through the water distribution port 4-1, and are discharged out through the back flushing and flushing drain-pipe 8.

Third Embodiment

A particulate filtering device with a multi-layer water distribution and collection structure is provided. As shown in FIGS. 1, 2, 8, 9 and 10, the number of the multiple water distribution and collection pipes 3 is three, and the three water distribution and collection pipes 3 include a second water distribution and collection pipe 3-12, a third water distribution and collection pipe 3-13 and a fourth water distribution and collection pipe 3-14 from top to bottom. The second water distribution and collection pipe 3-12 is in communication with the filtered water outlet manifold 6, and a fourth valve 3-24 and a seventh valve 3-27 are arranged between the second water distribution and collection pipe 3-12 and the filtered water outlet manifold 6. The third water distribution and collection pipe 3-13 is in communication with the water inlet manifold 5, and a second valve 3-22 is arranged between the third water distribution and collection pipe 3-13 and the water inlet manifold 5. The fourth water distribution and collection pipe 3-14 is in communication with the water inlet manifold 5, and a third valve 3-23 is arranged between the fourth water distribution and collection pipe 3-14 and the water inlet manifold 5. The fourth water distribution and collection pipe 3-14 is in communication with the filtered water outlet manifold 6, and a fourth valve 3-24 is arranged between the fourth water distribution and collection pipe 3-14 and the filtered water outlet manifold 6. The upper water distribution pipe 4 is in communication with the water inlet manifold 5, and a first valve 3-21 is arranged between the upper water distribution pipe 4 and the water inlet manifold 5. The water inlet manifold 5 is in communication with the filtered water outlet manifold 6, and a sixth valve 3-26, a fifth valve 3-25 and the fourth valve 3-24 are arranged between the water inlet manifold 5 and the filtered water outlet manifold 6. The ozone gas-water mixing pipe 7 is connected between the first valve 3-21 and the upper water distribution pipe 4. The back flushing and flushing drain-pipe 8 is connected between the sixth valve 3-26 and the fifth valve 3-25.

A method for performing activated carbon adsorption by the particulate filtering device with a multi-layer water distribution and collection structure is further provided. The method includes: opening the first valve 3-21, the fifth valve 3-25 and the seventh valve 3-27, closing the second valve 3-22, the third valve 3-23, the fourth valve 3-24 and the sixth valve 3-26, connecting the water inlet manifold 5 to an activated carbon powder slurry delivery pipe, and turning on the water pump 9, to draw activated carbon powder slurry through the water inlet manifold 5, where the activated carbon powder slurry is delivered to a space above the filtering space through the upper water distribution pipe 4 to form an activated carbon layer 10; and in a filtering phase, opening the first valve 3-21, the fourth valve 3-24 and the seventh valve 3-27, closing the second valve 3-22, the third valve 3-23, the fifth valve 3-25 and the sixth valve 3-26, connecting the water inlet manifold 5 to a to-be-filtered water delivery pipe, to guide to-be-filtered water to flow into the tank 1 through the water inlet manifold 5, where the to-be-filtered water is delivered to the back flushing expansion space through the upper water distribution pipe 4, the to-be-filtered water is processed by organics adsorption through the activated carbon layer 10 and is filtered by the particle filtering material 2 to form filtered water, the filtered water flows into the filtered water outlet manifold 6 through the second water distribution and collection pipe 3-12 and is discharged out.

Fourth Embodiment

A particulate filtering device with a multi-layer water distribution and collection structure is provided. As shown in FIGS. 1, 2, 11 and 12, the number of the multiple water distribution and collection pipes 3 is three, and the three water distribution and collection pipes 3 include a second water distribution and collection pipe 3-12, a third water distribution and collection pipe 3-13 and a fourth water distribution and collection pipe 3-14 from top to bottom. The second water distribution and collection pipe 3-12 is in communication with the filtered water outlet manifold 6, and a fourth valve 3-24 and a seventh valve 3-27 are arranged between the second water distribution and collection pipe 3-12 and the filtered water outlet manifold 6. The third water distribution and collection pipe 3-13 is in communication with the water inlet manifold 5, and a second valve 3-22 is arranged between the third water distribution and collection pipe 3-13 and the water inlet manifold 5. The fourth water distribution and collection pipe 3-14 is in communication with the water inlet manifold 5, and a third valve 3-23 is arranged between the fourth water distribution and collection pipe 3-14 and the water inlet manifold 5. The fourth water distribution and collection pipe 3-14 is in communication with the filtered water outlet manifold 6, and a fourth valve 3-24 is arranged between the fourth water distribution and collection pipe 3-14 and the filtered water outlet manifold 6. The upper water distribution pipe 4 is in communication with the water inlet manifold 5, and a first valve 3-21 is arranged between the upper water distribution pipe 4 and the water inlet manifold 5. The water inlet manifold 5 is in communication with the filtered water outlet manifold 6, and a sixth valve 3-26, a fifth valve 3-25 and the fourth valve 3-24 are arranged between the water inlet manifold 5 and the filtered water outlet manifold 6. The ozone gas-water mixing pipe 7 is connected between the first valve 3-21 and the upper water distribution pipe 4. The back flushing and flushing drain-pipe 8 is connected between the sixth valve 3-26 and the fifth valve 3-25.

A method for performing filtering/ozone reaction by the particulate filtering device with a multi-layer water distribution and collection structure is further provided. The method includes: opening the first valve 3-21, the fourth valve 3-24 and the seventh valve 3-27, and closing the second valve 3-22, the third valve 3-23, the fifth valve 3-25 and the sixth valve 3-26, and connecting the water inlet manifold 5 to a to-be-filtered water delivery pipe, to guide ozone water to flow into the tank 1 through an ozone gas-water mixing pipe 7 and guide to-be-filtered water flow into the tank 1 through the water inlet manifold 5, where the to-be-filtered water is delivered into the back flushing expansion space through the upper water distribution pipe 4 for reacting with ozone, gas in ozone gas water mixture and undisclosed ozone are escaped from water, and are discharged into an exhaust gas solver through the automatic air valve on the top of the tank 1, ozone dissolved into water disinfect the water while oxidizing and decomposing substances in the water, filtered water flows into the filtered water outlet manifold 6 through the second water distribution and collection pipe 3-12 and the fourth water distribution and collection pipe 3-14 and is discharged out.

Fifth Embodiment

A particulate filtering device with a multi-layer water distribution and collection structure is provided. As shown in FIGS. 1, 2, 13, 14 and 15, the number of the multiple water distribution and collection pipes 3 is three, and the three water distribution and collection pipes 3 include a second water distribution and collection pipe 3-12, a third water distribution and collection pipe 3-13 and a fourth water distribution and collection pipe 3-14 from top to bottom. The second water distribution and collection pipe 3-12 is in communication with the filtered water outlet manifold 6, and a fourth valve 3-24 and a seventh valve 3-27 are arranged between the second water distribution and collection pipe 3-12 and the filtered water outlet manifold 6. The third water distribution and collection pipe 3-13 is in communication with the water inlet manifold 5, and a second valve 3-22 is arranged between the third water distribution and collection pipe 3-13 and the water inlet manifold 5. The fourth water distribution and collection pipe 3-14 is in communication with the water inlet manifold 5, and a third valve 3-23 is arranged between the fourth water distribution and collection pipe 3-14 and the water inlet manifold 5. The fourth water distribution and collection pipe 3-14 is in communication with the filtered water outlet manifold 6, and a fourth valve 3-24 is arranged between the fourth water distribution and collection pipe 3-14 and the filtered water outlet manifold 6. The upper water distribution pipe 4 is in communication with the water inlet manifold 5, and a first valve 3-21 is arranged between the upper water distribution pipe 4 and the water inlet manifold 5. The water inlet manifold 5 is in communication with the filtered water outlet manifold 6, and a sixth valve 3-26, a fifth valve 3-25 and the fourth valve 3-24 are arranged between the water inlet manifold 5 and the filtered water outlet manifold 6. The ozone gas-water mixing pipe 7 is connected between the first valve 3-21 and the upper water distribution pipe 4. The back flushing and flushing drain-pipe 8 is connected between the sixth valve 3-26 and the fifth valve 3-25.

A method for performing filtering/ozone reaction/activated carbon adsorption/hydroxyl generation by the particulate filtering device with a multi-layer water distribution and collection structure is further provided. The method includes: opening the first valve 3-21, the fifth valve 3-25 and the seventh valve 3-27, closing the second valve 3-22, the third valve 3-23, the fourth valve 3-24 and the sixth valve 3-26, connecting the water inlet manifold 5 to an activated carbon powder slurry delivery pipe, and turning on the water pump 9, to draw activated carbon powder slurry through the water inlet manifold 5, where the activated carbon powder slurry is delivered to a space above the filtering space through the upper water distribution pipe 4 to form an activated carbon layer 10; and opening the first valve 3-21, the fourth valve 3-24 and the seventh valve 3-27, closing the second valve 3-22, the third valve 3-23, the fifth valve 3-25 and the sixth valve 3-26, and connecting the water inlet manifold 5 to a to-be-filtered water delivery pipe, to guide ozone water to flow into the tank 1 through an ozone gas-water mixing pipe 7 and guide to-be-filtered water flow into the tank 1 through the water inlet manifold 5, where the to-be-filtered water is delivered into the back flushing expansion space through the upper water distribution pipe 4 for reacting with ozone, gas in ozone gas water mixture and undisclosed ozone are escaped from water, and are discharged into an exhaust gas solver through the automatic air valve on the top of the tank 1, ozone is decomposed catalysis of activated carbon to generate a strong oxidant hydroxyl when the ozone water flows through the activated carbon layer 10, to perform oxidation and disinfection on the to-be-filtered water, then filtered water flows into the filtered water outlet manifold 6 through the second water distribution and collection pipe 3-12 and the fourth water distribution and collection pipe 3-14 and is discharged out.

Sixth Embodiment

Figure 3:
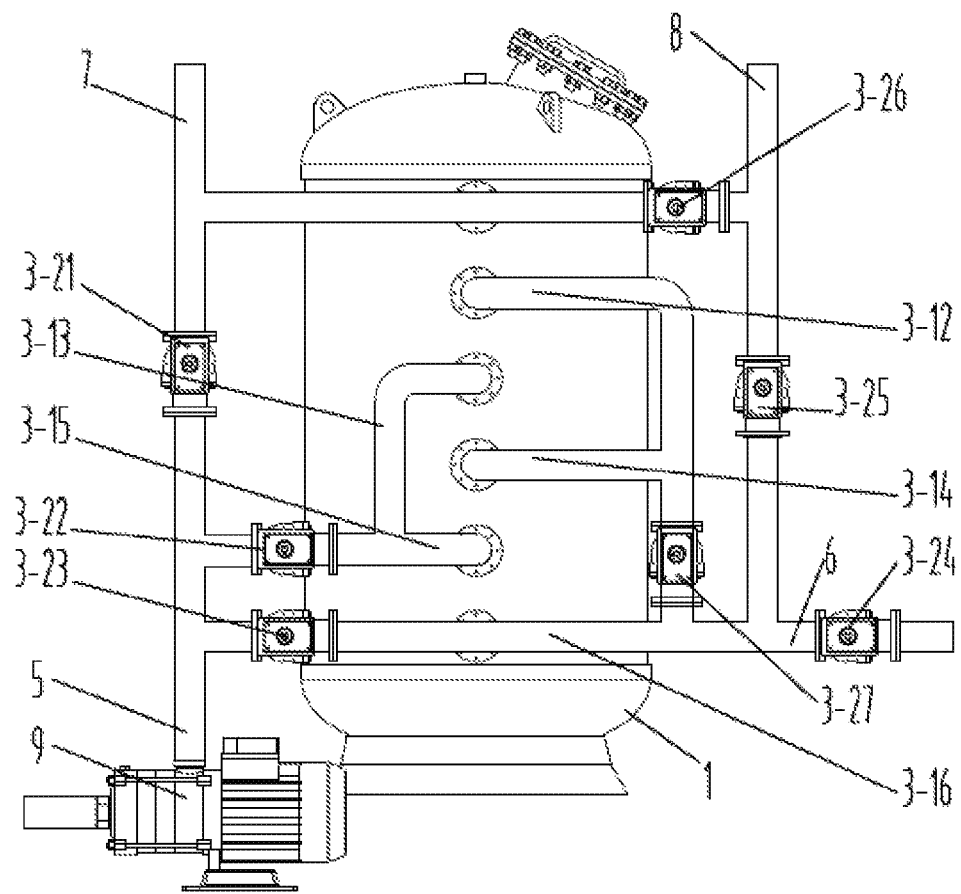
FIG. 3 is a schematic structural diagram of a particulate filtering device with a multi-layer water distribution and collection structure according to a sixth embodiment of the present disclosure.
Figure 4:
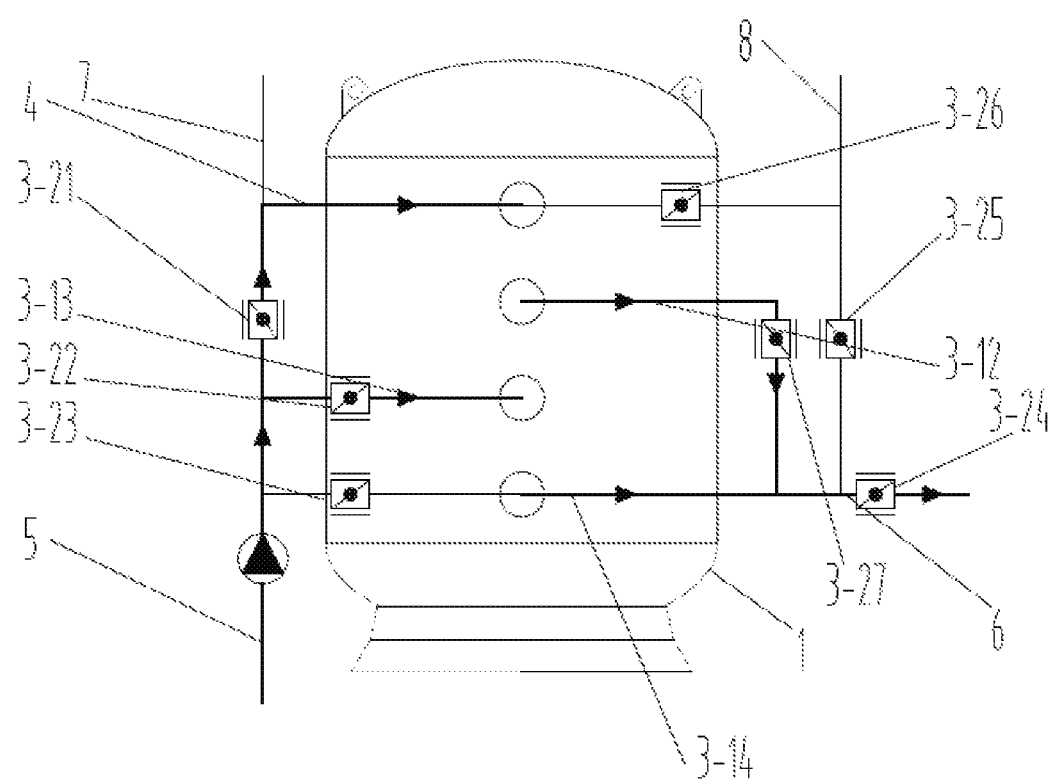
FIG. 4 is a schematic diagram showing a flow path outside of a tank 1 according to a first embodiment of the present disclosure.
Figure 5:
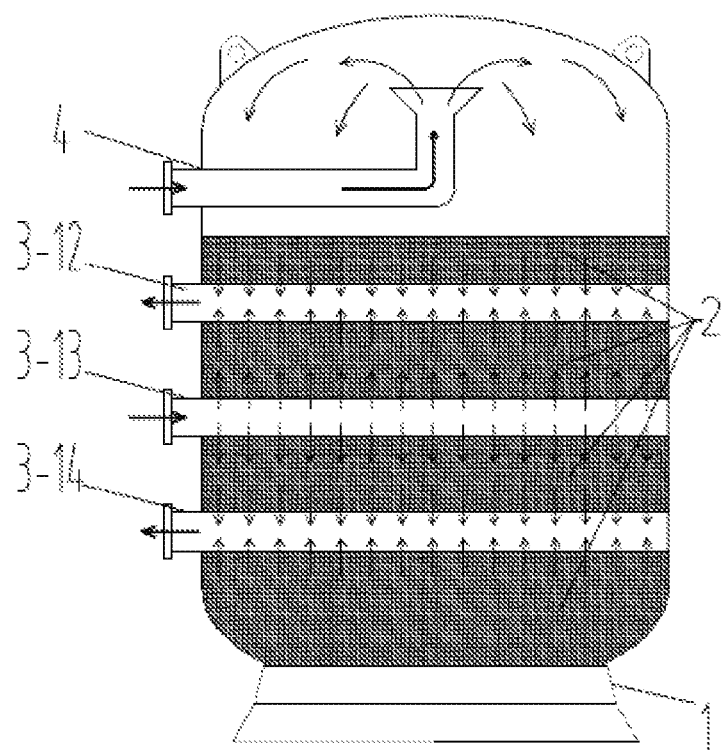
FIG. 5 is a schematic diagram showing a flow path inside of the tank 1 according to the first embodiment of the present disclosure.
Figure 6:
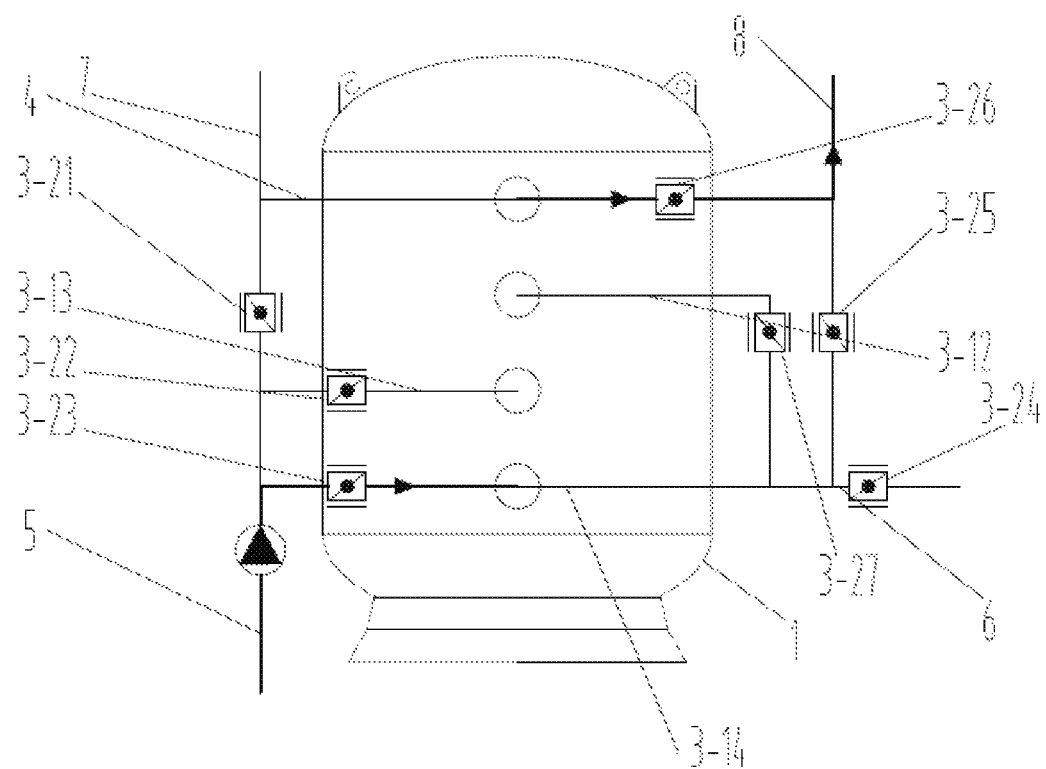
FIG. 6 is a schematic diagram showing a flow path outside of a tank 1 according to a second embodiment of the present disclosure.
Figure 7:
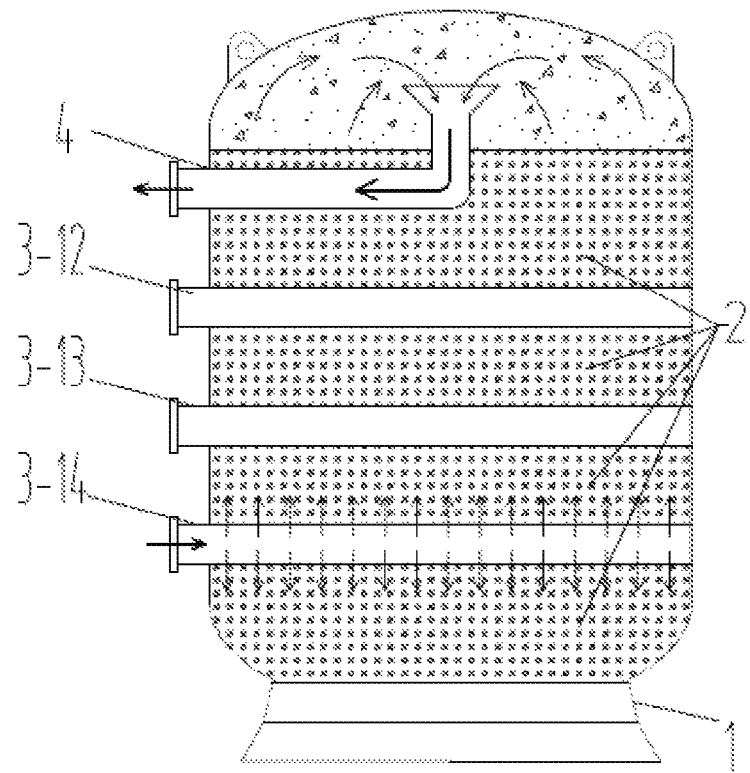
FIG. 7 is a schematic diagram showing a flow path inside of the tank 1 according to the second embodiment of the present disclosure.
Figure 8:
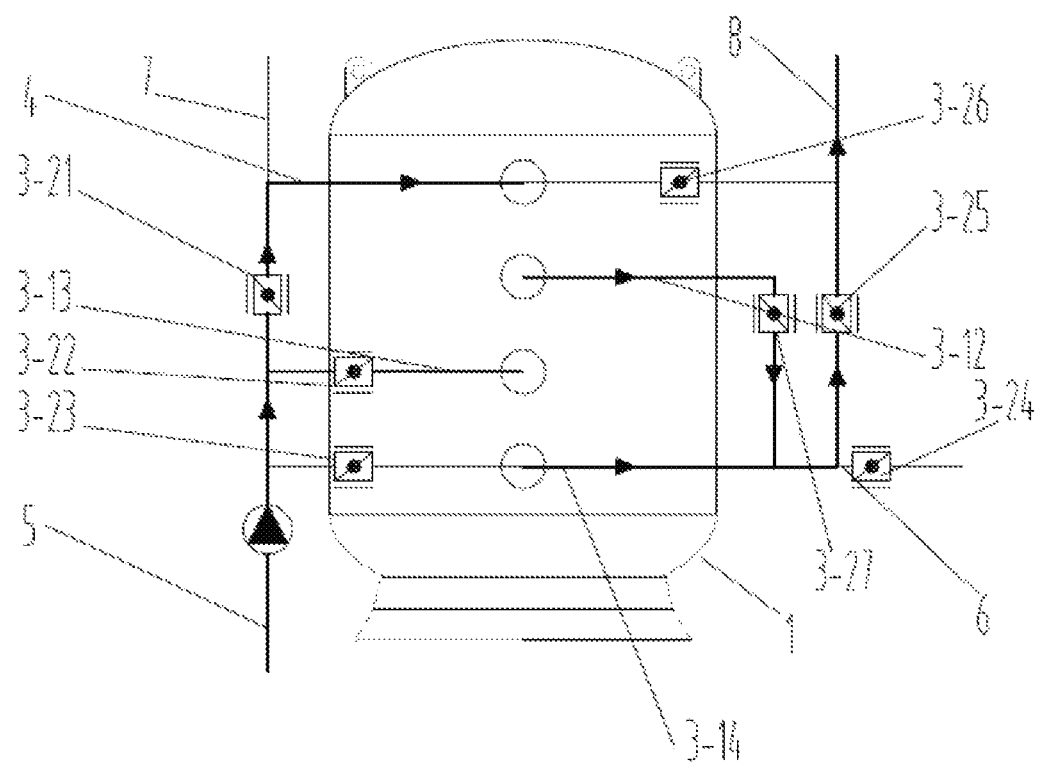
FIG. 8 is a schematic diagram showing a flow path outside of a tank 1 according to a third embodiment of the present disclosure when activated carbon is added.
Figure 9:
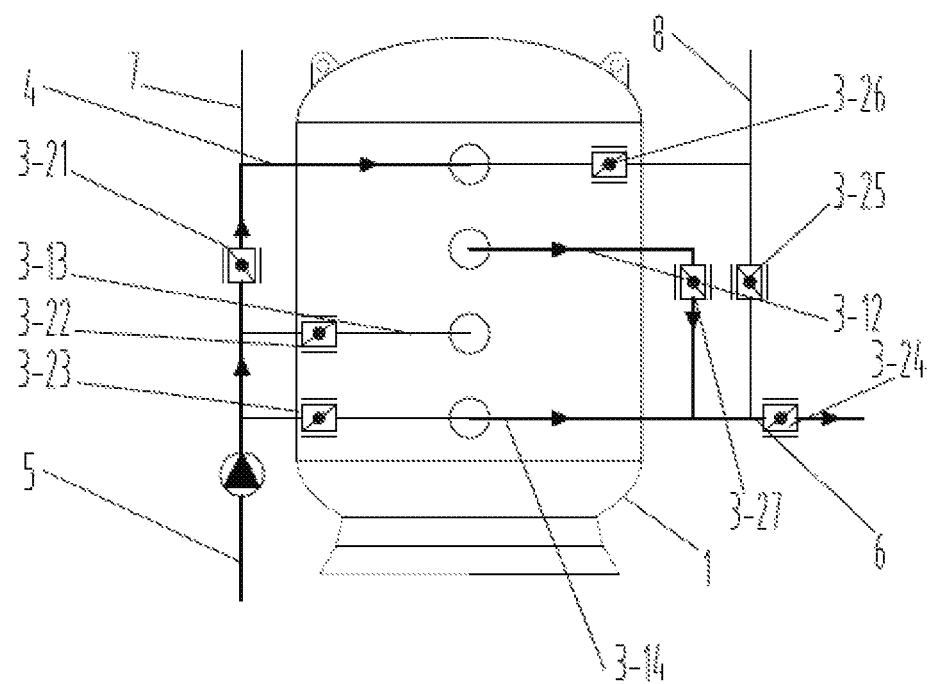
FIG. 9 is a schematic diagram showing a flow path outside of the tank 1 according to the third embodiment of the present disclosure.
Figure 10:
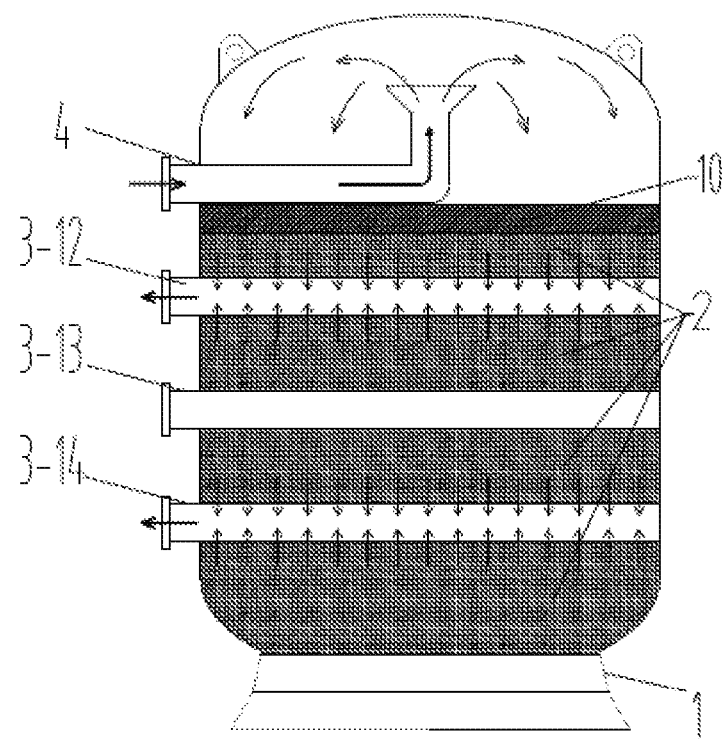
FIG. 10 is a schematic diagram showing a flow path inside of the tank 1 according to the third embodiment of the present disclosure.
Figure 11:
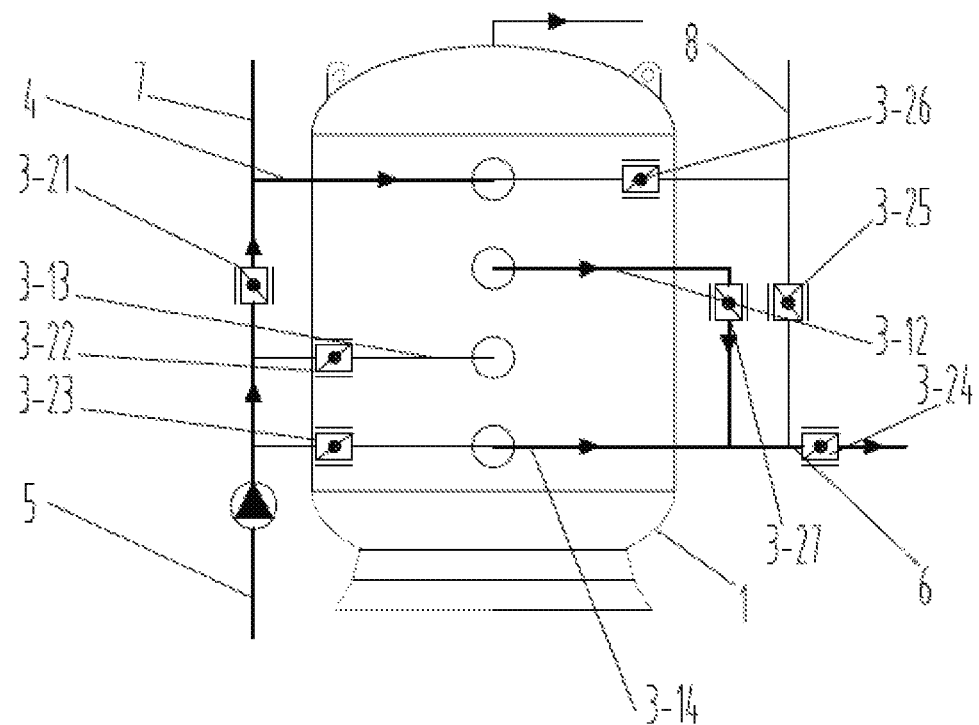
FIG. 11 is a schematic diagram showing a flow path outside of a tank 1 according to a fourth embodiment of the present disclosure.
Figure 12:
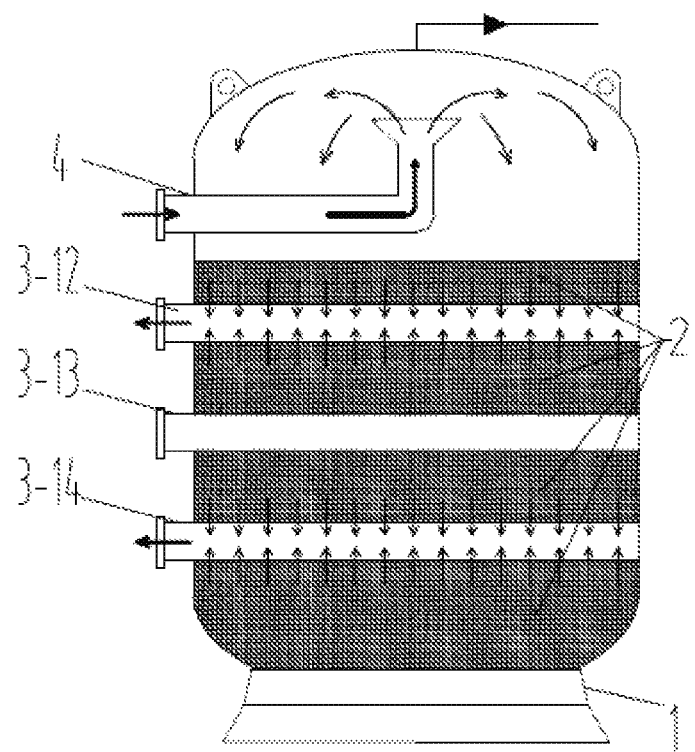
FIG. 12 is a schematic diagram showing a flow path inside of the tank 1 according to the fourth embodiment of the present disclosure.
Figure 13:
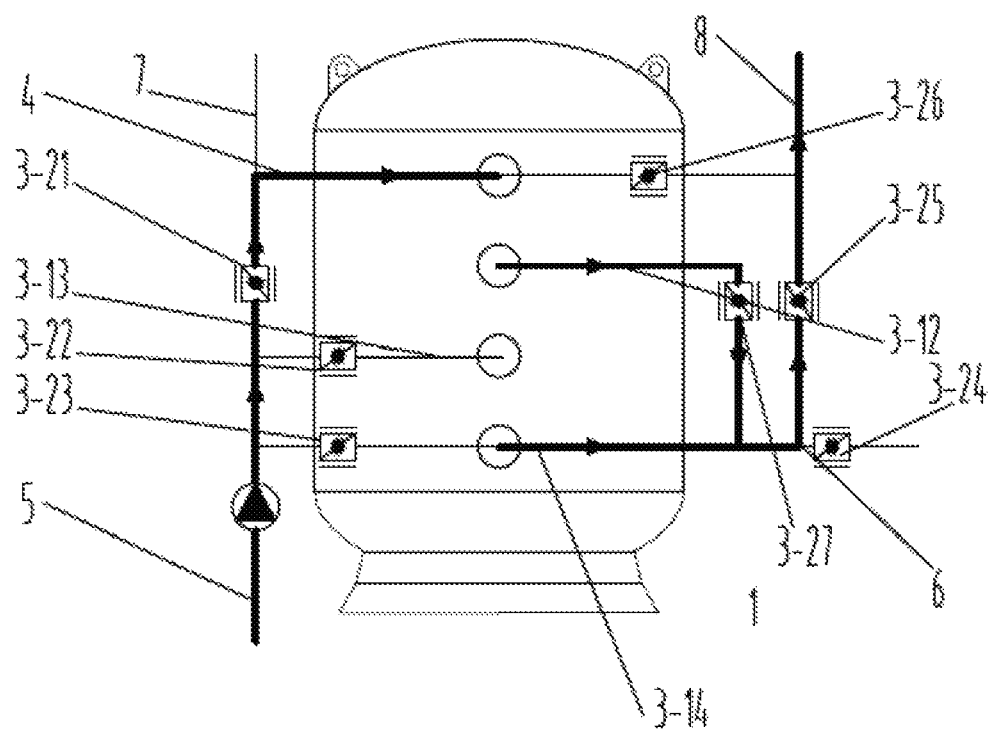
FIG. 13 is a schematic diagram showing a flow path outside of a tank 1 according to a fifth embodiment of the present disclosure when activated carbon is added.
Figure 14:
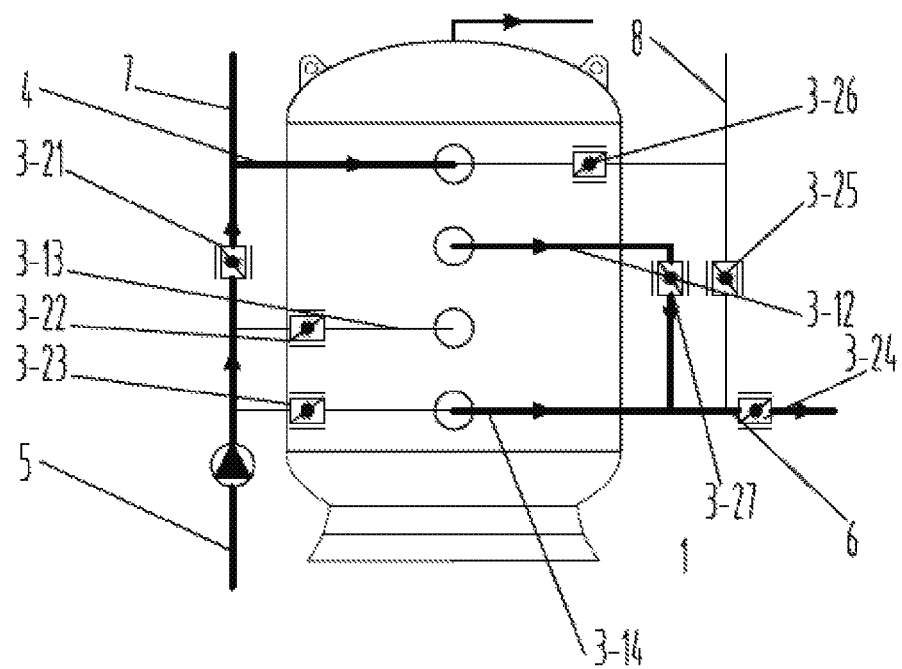
FIG. 14 is a schematic diagram showing a flow path outside of the tank 1 according to the fifth embodiment of the present disclosure.
Figure 15:
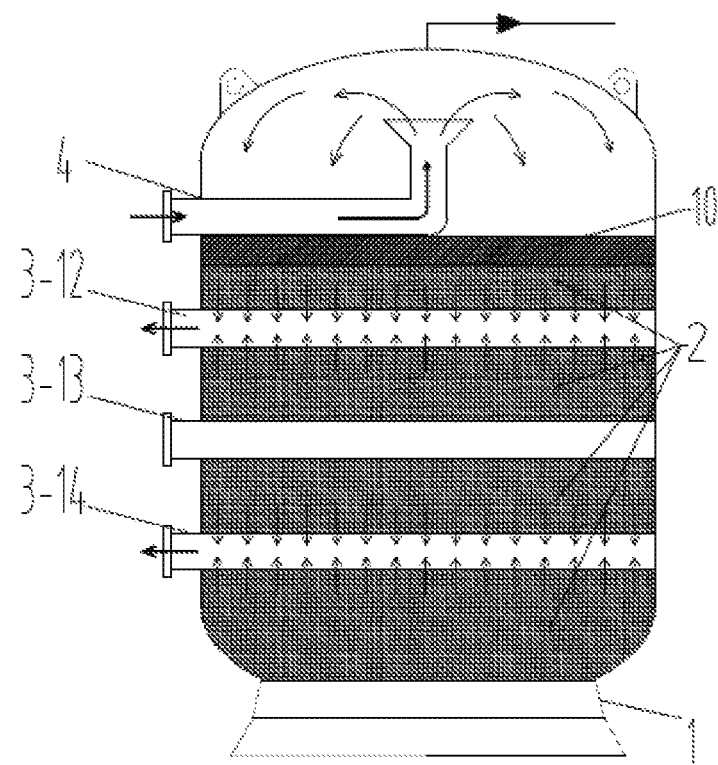
FIG. 15 is a schematic diagram showing a flow path inside of the tank 1 according to the fifth embodiment of the present disclosure.

A particulate filtering device with a multi-layer water distribution and collection structure is provided. As shown in FIG. 3, the number of the multiple water distribution and collection pipes 3 is five, and the five water distribution and collection pipes 3 include a second water distribution and collection pipe 3-12, a third water distribution and collection pipe 3-13, a fourth water distribution and collection pipe 3-14, a fifth water distribution and collection pipe 3-15 and a sixth water distribution and collection pipe 3-16 from top to bottom. The second water distribution and collection pipe 3-12 is in communication with the filtered water outlet manifold 6, and a fourth valve 3-24 and a seventh valve 3-27 are arranged between the second water distribution and collection pipe 3-12 and the filtered water outlet manifold 6. The third water distribution and collection pipe 3-13 is in communication with the water inlet manifold 5, and a second valve 3-22 is arranged between the third water distribution and collection pipe 3-13 and the water inlet manifold 5. The fourth water distribution and collection pipe 3-14 is in communication with the water inlet manifold 5, and a third valve 3-23 is arranged between the fourth water distribution and collection pipe 3-14 and the water inlet manifold 5. The fourth water distribution and collection pipe 3-14 is in communication with the filtered water outlet manifold 6, and a fourth valve 3-24 is arranged between the fourth water distribution and collection pipe 3-14 and the filtered water outlet manifold 6. The fifth water distribution and collection pipe 3-15 is in communication with the water inlet manifold 5, and a second valve 3-22 is arranged between the fifth water distribution and collection pipe 3-15 and the water inlet manifold 5. The sixth water distribution and collection pipe 3-16 is in communication with the water inlet manifold 5, and a third valve 3-23 is arranged between the sixth water distribution and collection pipe 3-16 and the water inlet manifold 5. The sixth water distribution and collection pipe 3-16 is in communication with the filtered water outlet manifold 6, and a fourth valve 3-24 is arranged between the sixth water distribution and collection pipe 3-16 and the filtered water outlet manifold 6. The upper water distribution pipe 4 is in communication with the water inlet manifold 5, and a first valve 3-21 is arranged between the upper water distribution pipe 4 and the water inlet manifold 5. The water inlet manifold 5 is in communication with the filtered water outlet manifold 6, and a sixth valve 3-26, a fifth valve 3-25 and the fourth valve 3-24 are arranged between the water inlet manifold 5 and the filtered water outlet manifold 6. The ozone gas-water mixing pipe 7 is connected between the first valve 3-21 and the upper water distribution pipe 4. The back flushing and flushing drain-pipe 8 is connected between the sixth valve 3-26 and the fifth valve 3-25.

The embodiments described above are only preferred embodiments of the present disclosure. Any other embodiments obtained by those skilled in the art without any creative effort should fall within the protection scope of the present disclosure.

The invention claimed is:

1. A particulate filtering device with a multi-layer water distribution and collection structure, comprising:
   a tank, wherein a filtering space is formed in a lower portion of the tank and a back flushing expansion space is formed in an upper portion of the tank;
   particle filtering material filled in the filtering space;
   a plurality of water distribution and collection pipes arranged on a layer basis in the filtering space, wherein each of water distribution and collection pipes is arranged horizontally, and each of the water distribution and collection pipes is provided with filtering sticks;
   an upper water distribution pipe arranged in the back flushing expansion space, wherein the plurality of water distribution and collection pipes and the upper water distribution pipe each extends out the tank at one end in a sealing manner;
   a water inlet manifold connected in parallel with an extending end of each of one or more of the water distribution and collection pipes via a pipe,
   a filtered water outlet manifold connected in parallel with an extending end of each of the rest of the water distribution and collection pipes, wherein valves are respectively arranged between the water distribution and collection pipe and the water inlet manifold and between the water distribution and collection pipe and the filtered water outlet manifold, an extending end of the upper water distribution pipe is connected with the water inlet manifold and the filtered water outlet manifold via a tee pipe, a valve is arranged between the upper water distribution pipe and the water inlet manifold;
   an ozone gas-water mixing pipe connected between the upper water distribution pipe and the water inlet manifold, wherein a valve is arranged between the upper water distribution pipe and the filtered water outlet manifold;
   a back flushing and flushing drain-pipe connected between the upper water distribution pipe and the filtered water outlet manifold; and
   a water pump connected with the water inlet manifold, wherein
   an air outlet is arranged on a top of the tank, and an automatic air valve is arranged at the air outlet.

2. The particulate filtering device with a multi-layer water distribution and collection structure according to claim 1, wherein a diameter of the particle filtering material ranges from 0.15 mm to 0.8 mm, and a ratio of a distance between adjacent layers of water distribution and collection pipes to an average diameter of the particle filtering material is equal to or greater than 800.

3. The particulate filtering device with a multi-layer water distribution and collection structure according to claim 1, wherein the filtering sticks are arranged in a fishbone shaped distribution and are connected with another end of each of the water distribution and collection pipe other than the extending end, each of the filtering stick is provided with a water inlet and outlet slot, and a width of the water inlet and outlet slot is less than the diameter of the particle filtering material.

4. The particulate filtering device with a multi-layer water distribution and collection structure according to claim 1, wherein another end of the upper water distribution pipe other than the extending end is connected with a water distribution port with an upward opening.

5. The particulate filtering device with a multi-layer water distribution and collection structure according to claim 1, wherein the number of the plurality of water distribution and collection pipes is three, and the three water distribution and collection pipes comprise a second water distribution and collection pipe, a third water distribution and collection pipe and a fourth water distribution and collection pipe from top to bottom, and wherein
   the second water distribution and collection pipe is in communication with the filtered water outlet manifold, and a fourth valve and a seventh valve are arranged between the second water distribution and collection pipe and the filtered water outlet manifold;
   the third water distribution and collection pipe is in communication with the water inlet manifold, and a second valve is arranged between the third water distribution and collection pipe and the water inlet manifold;
   the fourth water distribution and collection pipe is in communication with the water inlet manifold, and a third valve is arranged between the fourth water distribution and collection pipe and the water inlet manifold; and the fourth water distribution and collection pipe is in communication with the filtered water outlet manifold, and a fourth valve is arranged between the fourth water distribution and collection pipe and the filtered water outlet manifold;

the upper water distribution pipe is in communication with the water inlet manifold, and a first valve is arranged between the upper water distribution pipe and the water inlet manifold;

the water inlet manifold is in communication with the filtered water outlet manifold, and a sixth valve, a fifth valve and the fourth valve are arranged between the water inlet manifold and the filtered water outlet manifold;

the ozone gas-water mixing pipe is connected between the first valve and the upper water distribution pipe; and the back flushing and flushing drain-pipe is connected between the sixth valve and the fifth valve.

6. A method for performing filtering by the particulate filtering device with a multi-layer water distribution and collection structure according to claim 5, the method comprising:

opening the first valve, the second valve, the fourth valve and the seventh valve, closing the third valve, the fifth valve and the sixth valve, and turning on the water pump, to guide to-be-filtered water to flow into the tank through the water inlet manifold, wherein a part of the to-be-filtered water flows into the filtering space through the filtering sticks of the third water distribution and collection pipes, filtered water formed by filtering the part of the to-be-filtered water through the particle filtering material flows into the filtered water outlet manifold through the fourth water distribution and collection pipe and is discharged out, and another part of the to-be-filtered water flows into the back flushing expansion space through the upper water distribution pipe, and then flows into the filtering space after flowing through the back flushing expansion space, filtered water formed by filtering the another part of the to-be-filtered water through the particle filtering material flows into the filtered water outlet manifold through the second water distribution and collection pipe and is discharged out.

7. A method for performing back flushing by the particulate filtering device with a multi-layer water distribution and collection structure according to claim 5, comprising:

opening the third valve and the sixth valve, closing the first valve, the second valve, the fourth valve, the fifth valve and the seventh valve, and turning on the water pump, to guide back flushing water to flow into the tank through the water inlet manifold, wherein the back flushing water flows into the filtering space through the filtering sticks of the fourth water distribution and collection pipe, to make a filtering layer formed by the particle filtering material expand, to flush impurities attaching to the particle filtering material into the back flushing expansion space, and the back flushing water and the impurities flow into the upper water distribution pipe through the water distribution port, and are discharged out through the back flushing and flushing drain-pipe.

8. A method for performing activated carbon adsorption by the particulate filtering device with a multi-layer water distribution and collection structure according to claim 5, comprising:

opening the first valve, the fifth valve and the seventh valve, closing the second valve, the third valve, the fourth valve and the sixth valve, connecting the water inlet manifold to an activated carbon powder slurry delivery pipe, and turning on the water pump, to draw activated carbon powder slurry through the water inlet manifold, wherein the activated carbon powder slurry is delivered to a space above the filtering space through the upper water distribution pipe to form an activated carbon layer; and in a filtering phase, opening the first valve, the fourth valve and the seventh valve, closing the second valve, the third valve, the fifth valve and the sixth valve, connecting the water inlet manifold to a to-be-filtered water delivery pipe, to guide to-be-filtered water to flow into the tank through the water inlet manifold, wherein the to-be-filtered water is delivered to the back flushing expansion space through the upper water distribution pipe, the to-be-filtered water is processed by organics adsorption through the activated carbon layer and is filtered by the particle filtering material to form filtered water, the filtered water flows into the filtered water outlet manifold through the second water distribution and collection pipe and is discharged out.

9. A method for performing filtering/ozone reaction by the particulate filtering device with a multi-layer water distribution and collection structure according to claim 5, comprising:

opening the first valve, the fourth valve and the seventh valve, and closing the second valve, the third valve, the fifth valve and the sixth valve, and connecting the water inlet manifold to a to-be-filtered water delivery pipe, to guide ozone water to flow into the tank through an ozone gas-water mixing pipe and guide to-be-filtered water flow into the tank through the water inlet manifold, wherein the to-be-filtered water is delivered into the back flushing expansion space through the upper water distribution pipe for reacting with ozone, gas in ozone gas water mixture and undisclosed ozone are escaped from water, and are discharged into an exhaust gas solver through the automatic air valve on the top of the tank, ozone dissolved into water disinfect the water while oxidizing and decomposing substances in the water, filtered water flows into the filtered water outlet manifold through the second water distribution and collection pipe and the fourth water distribution and collection pipe and is discharged out.

10. A method for performing filtering/ozone reaction/activated carbon adsorption/hydroxyl generation by the particulate filtering device with a multi-layer water distribution and collection structure according to claim 5, comprising:

opening the first valve, the fifth valve and the seventh valve, closing the second valve, the third valve, the fourth valve and the sixth valve, connecting the water inlet manifold to an activated carbon powder slurry delivery pipe, and turning on the water pump), to draw activated carbon powder slurry through the water inlet manifold, wherein the activated carbon powder slurry is delivered to a space above the filtering space through the upper water distribution pipe to form an activated carbon layer; and opening the first valve, the fourth valve and the seventh valve, closing the second valve, the third valve, the fifth valve and the sixth valve, and connecting the water inlet manifold to a to-be-filtered water delivery pipe, to guide ozone water to flow into the tank through an ozone gas-water mixing pipe and guide to-be-filtered water flow into the tank through the water inlet manifold, wherein the to-be-filtered water is delivered into the back flushing expansion space through the upper water distribution pipe for reacting with ozone, gas in ozone gas water mixture and undisclosed ozone are escaped from water, and are discharged into an exhaust gas solver through the automatic air valve on the top of the tank, ozone is decomposed catalysis of activated carbon to generate a strong oxidant hydroxyl when the ozone water flows through the activated carbon layer, to perform oxidation and disinfection on the to-be-filtered water, then filtered water flows into the filtered water outlet manifold through the second water distribution and collection pipe and the fourth water distribution and collection pipe and is discharged out.

* * * * *